Dec. 29, 1936.  G. J. STREZYNSKI ET AL  2,066,166
PROCESS OF TREATING A COLD MIXTURE OF ACID SLUDGE, OIL AND WAX
Filed July 25, 1935
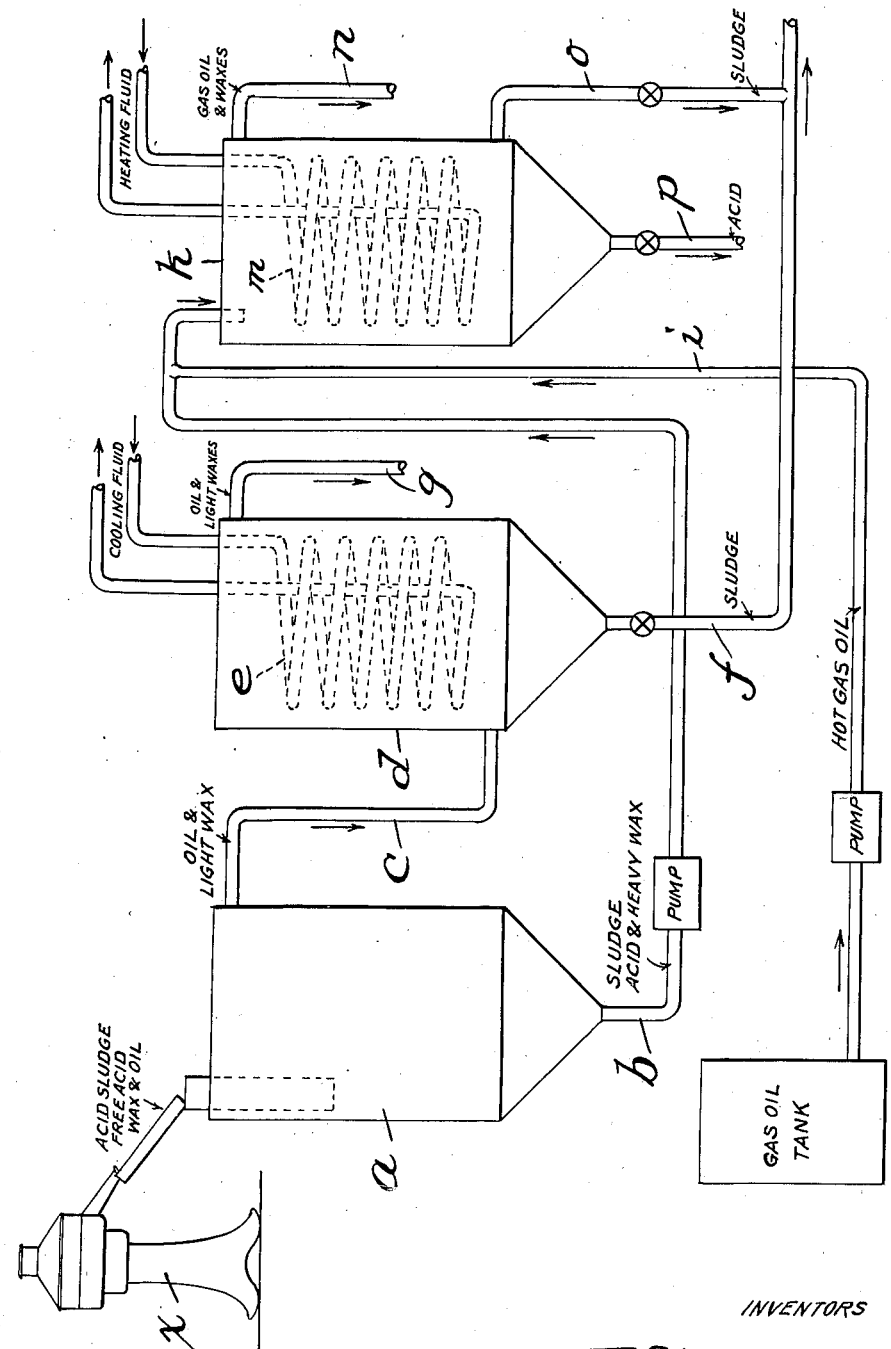
INVENTORS
George J. Strezynski
George M. Pfau
BY
ATTORNEYS
WITNESS:

UNITED STATES PATENT OFFICE 2,066,166

PROCESS OF TREATING A COLD MIXTURE OF ACID SLUDGE, OIL, AND WAX

George J. Strezynski, Poughkeepsie, N. Y., and George M. Pfau, Fort Worth, Tex., assignors to The De Laval Separator Company, New York, N. Y., a corporation of New Jersey Application July 25, 1935, Serial No. 33,074

6 Claims. (Cl. 196—148)

In an application filed by George J. Strezynski, June 17, 1935, Serial No. 28,665, there is set forth an improved process for producing, from paraffin base (including mixed base) crude petroleum, purified low pour point oil from which is completely removed all the wax, crystalline as well as amorphous, down to the temperature of the pour point desired. The process involves dilution with a light diluent, such as naphtha or other light hydrocarbon, refrigeration to precipitate the wax, followed by acid treatment, followed by a special centrifugal process effecting the separation of the purified dewaxed oil from a waxy acid sludge.

The separated sludge contains also free acid and oil. The object of the present invention is to subject the sludge to a series of treatments adapted to produce steam refined lubricating stock, paraffin and petrolatum and to recover the free acid.

The use of the improved process forming the subject-matter of the appended claims is not dependent on the employment of the precise refrigerating, acid-treating and centrifuging steps set forth in said application, and the specified purifying and dewaxing process will therefore not be described in detail. While the present process is especially adapted to the treatment of sludge separated in said process, it is applicable, although perhaps to less advantage, to any waxy acid sludge that is separated in the final step of any chilling and acid-treating process adapted to produce, from paraffin base crude, a purified and dewaxed oil.

In the present process the wax and oil bearing acid sludge is subjected to the following series of treatments which may be more clearly understood by reference to an apparatus which we have designed, and found especially efficient, for carrying out the process. It will be understood, however, that the process is not dependent for its execution upon the use of the apparatus specified or any other particular apparatus. The accompanying drawing is a diagram in elevation of the treating plant.

The wax and oil bearing acid sludge from the centrifuge $x$ is delivered to a tank $a$, which may be, for example, a 500 gallon tank, wherein the sludge is allowed to rise in temperature to about 40 or 50° F. Waxes of low melting point melt at this temperature and rise to the surface with the entrained oil. Instead of a settling tank, the oil and wax may be centrifugally separated. The separated sludge is drawn off through a pipe $b$. The separated oil, with such wax as it contains, is drawn off through a pipe $c$ to a second tank $d$, which is maintained at or about the above temperature by a cooling coil $e$. Any residual sludge that is carried over with the oil and light wax is drawn off through a pipe $f$. The oil, with such wax as it contains, is drawn off through a pipe $g$, neutralized, and distilled for naphtha and gas oil recovery and the production of a steam refined stock with a pour point of about 60° F.

The sludge settled in tank $a$, which now contains only high melting waxes, acid sludge and free acid, and which is drawn off from the first tank through the pipe $b$, is transferred to a third tank $k$ and is therein mixed with a gas oil, having a preferential boiling range of 250–600° F., at a temperature of 200–350° F., preferably about 300° F. The gas oil is delivered through a pipe $i$. The mixture of sludge and gas oil in tank $k$ is maintained at the desired temperature, or raised in temperature, by means of a steam coil heater $m$. This method of heating prevents local overheating (which would cause further acid reaction and sludge caking) and eliminates the long time period which other and conventional methods of heating would require. As a further insurance against the building of wax, the gas oil should be added as a stream which merges with the stream of the mixture before their entry into the tank.

It is also practicable to introduce the hot gas oil into the bowl housing of the centrifuge $x$ during its operation to effect mixing of the hot gas oil with the cold wax and sludge discharged from the bowl. Thereby the whirling action of the liquid may be utilized for mixing and the building of hard wax in the frame of the machine avoided. The resultant mixture may go direct to a tank similar to tank $k$. Or, less desirably, the cold wax and sludge discharged from the centrifuge may be conveyed to a settling tank, similar to $k$, containing the hot gas oil or into which a stream of hot gas oil may be at the same time admitted.

The preferable proportions of sludge and heating liquid in the tank $k$ are about half and half, but these proportions may be varied dependent on the temperature of the heating liquid and on other factors. For example, the heating liquid need not be gas oil, but may be any suitable diluent, preferably one, such as some other mixture of hydrocarbons, which will form a solution with the melted waxes. It is desirable to maintain the material in the tank $k$ between 120 and 180° F., preferably about 150° F. At this temperature all the waxes are melted out of the sludge, allowing immediate settlement of sludge and free acid from the waxes and from each other. The three layers of melted wax (or solution of wax and diluent), sludge and free acid are drawn off through the three pipes $n$, $o$ and $p$.

The melted waxes, withdrawn through pipe $n$, are fractioned into diluent, crystalline wax and petrolatum. The crystalline wax is comparatively oil-free and therefore requires no pressing and may be sweated directly. The petrolatum, being practically oil-free, has a higher melting point than that obtainable by other methods.

About 80% of the free acid withdrawn through pipe $p$ is recoverable as concentrated acid, reusable in the centrifugal dewaxing and purifying process; the remainder being a weak acid suitable for other uses.

The small amount of sludge withdrawn from the second tank $d$ through pipe $f$ may be connected with the sludge draw-off pipe $o$, as shown; or it may connect with pipe $b$; or it may connect with the acid draw-off pipe $p$.

What we claim and desire to protect by Letters Patent is:

1. The process of treating a cold mixture of acid sludge, oil and wax that has been separated from a purified and dewaxed oil, for recovering from said mixture refined lubricating oil, crystalline wax and petrolatum, which comprises raising the temperature of the mixture while limiting the temperature to within 40 to 60° F., separating oil and light waxes from the acid sludge, free acid and heavier waxes, elevating the temperature of the mixture of acid sludge, free acid and heavier waxes to 120–180° F. and separating the heavy waxes, the free acid and the acid sludge, and distilling from the waxes a substantially oil-free crystalline wax, leaving a petrolatum residue.

2. In the process of treating a mixture of acid sludge, free acid, oil and wax that has been separated from a purified and dewaxed oil, the step of separating the wax from said mixture which comprises heating it to a temperature sufficient to melt the wax and supplying said heat mainly by adding to the mixture a diluent at a temperature of 200 to 350° F. and separating the melted wax and diluent from the acid and acid sludge, whereby the wax is rapidly heated with avoidance of local overheating.

3. In the process of treating a mixture of acid sludge, free acid, oil and wax that has been separated from a purified and dewaxed oil, the step of separating the wax from said mixture which comprises heating it to a temperature sufficient to melt the wax and supplying said heat mainly by adding to the mixture a hot liquid adapted to form a solution with the melted wax, said solvent liquid being added at a temperature between 200 and 350° F. and in such proportion as to heat said mixture to a temperature within about the range 120–180° F., and separating the solution from the acid and acid sludge.

4. In the process of treating a cold mixture of acid sludge, free acid, oil and wax that has been centrifugally separated from a purified and dewaxed oil, the step of separating the wax from the said separated mixture which comprises heating it to a temperature sufficient to melt the wax and supplying said heat mainly by adding to said mixture, in the housing of the centrifuge, a diluent at a temperature of 200 to 350° F. and thereafter separating the melted wax and diluent from the acid and acid sludge, whereby the mixing is rapidly and thoroughly effected and the building of hard wax in the centrifuge frame is avoided.

5. The process of treating a mixture of acid sludge, free acid, oil and wax that have been separated from a purified and dewaxed oil, for recovering from said mixture free acid and the production of refined lubricating oil, crystalline wax and petrolatum, which comprises separating oil and light waxes from the acid sludge, free acid and heavier waxes, producing from the oil and light waxes a refined lubricating oil, mixing the mixture of acid sludge, free acid and heavier waxes with a heating liquid comprising mainly a mixture of hydrocarbons within the boiling range 250–600° F., which has been heated to a temperature of from 200 to 350° F., separating from the mixture the oil and melted waxes, the free acid and the acid sludge, distilling off the oil, and producing from the last named waxes paraffin wax and petrolatum.

6. The process of treating a mixture of acid sludge, free acid, oil and wax that has been separated from a purified and dewaxed oil, for recovering from said mixture free acid and the production of refined lubricating oil, crystalline wax and petrolatum, which comprises separating oil and light waxes from the acid sludge, free acid and heavier waxes, producing from the oil and light waxes a refined lubricating oil, mixing the mixture of acid sludge, free acid and heavier waxes with a diluent adapted to form a solution with the waxes and comprising mainly a mixture of hydrocarbon oils within the boiling range 250 to 600° F. which has been heated to a temperature of from 200 to 350° F., and regulating the desired temperature of the mixture of free acid, acid sludge and oil-wax solution by maintaining it in heating relation but out of contact with another heating medium, separating from the mixture the oil and melted waxes, the free acid and the acid sludge, distilling off the gas oil, and producing from the last named waxes paraffin wax and petrolatum.

GEORGE J. STREZYNSKI.
GEORGE M. PFAU.